(12) United States Patent
Claessens et al.

(10) Patent No.: US 9,203,745 B2
(45) Date of Patent: Dec. 1, 2015

(54) ROUTING TABLE UPDATING

(71) Applicant: NXP B.V., Eindhoven (NL)

(72) Inventors: Valentin Claessens, Sint-Truiden (BE); Norbert Philips, Bertem (BE); Steven Mark Thoen, Leuven (BE)

(73) Assignee: NXP B.V., Eindhoven (NL)

( * ) Notice: Subject to any disclaimer, the term of this patent is extended or adjusted under 35 U.S.C. 154(b) by 108 days.

(21) Appl. No.: 14/049,498

(22) Filed: Oct. 9, 2013

(65) Prior Publication Data

US 2014/0112126 A1    Apr. 24, 2014

(30) Foreign Application Priority Data

Oct. 24, 2012 (EP) .................................... 12189784

(51) Int. Cl.
| H04L 12/741 | (2013.01) |
| H04L 12/801 | (2013.01) |
| H04L 12/751 | (2013.01) |
| H04L 12/721 | (2013.01) |
| H04L 12/24 | (2006.01) |

(52) U.S. Cl.
CPC ................ *H04L 45/54* (2013.01); *H04L 45/02* (2013.01); *H04L 47/12* (2013.01); *H04L 41/12* (2013.01); *H04L 45/12* (2013.01)

(58) Field of Classification Search
None
See application file for complete search history.

(56) References Cited

U.S. PATENT DOCUMENTS

| 4,782,519 | A | * | 11/1988 | Patel et al. ................ 379/201.05 |
| 4,864,563 | A | * | 9/1989 | Pavey et al. .................... 370/254 |
| 6,633,544 | B1 | * | 10/2003 | Rexford et al. ............... 370/238 |
| 2007/0217346 | A1 | | 9/2007 | Zheng et al. |
| 2009/0135824 | A1 | * | 5/2009 | Liu ................................ 370/392 |

OTHER PUBLICATIONS

Extended European Search Report for EP Patent Appln. No. 12189784.7 (Feb. 18, 2013).

* cited by examiner

*Primary Examiner* — Vinncelas Louis

(57) ABSTRACT

A method of transmitting routing information within a network is disclosed. In an embodiment, the method involves providing a message including a digital word in which at least each node in the mesh network other than the one node and the another node is represented by a single binary bit. The binary bit associated with each node is set to one value if the node is in the preferred route and the other value if the node is not in the preferred route.

13 Claims, 3 Drawing Sheets

| Distance | Gateway |
|----------|---------|
| X bits   | X bits  |

| First hop | Second hop | ... | $(2^x-2)^{th}$ hop |
|-----------|------------|-----|--------------------|
| X bits    | X bits     |     | X bits             |

| 0 | 0 | 0 | 0 | ... | 0 | 0 | 0 | 0 |
|---|---|---|---|-----|---|---|---|---|

$(2^x-2)$ bits

Routing table of device 5

0: 0b000101
1: 0b000100
2: 0b000110
3: 0b000000
4: 0b001110

ROUTING TABLE UPDATING

CROSS-REFERENCE TO RELATED APPLICATIONS

This application claims the priority under 35 U.S.C. §119 of European patent application no. 12189784.7, filed on Oct. 24, 2012, the contents of which are incorporated by reference herein.

This invention relates to the updating of routing tables, and in particular relates to an efficient routing table update protocol for networks maintaining complete routing path tables.

Network protocol implementations that support partial mesh networks (which are networks where all devices are not within range of each other) often offer routing functionality to allow each node in a network to exchange data with any other node in the network, even if they are not in each other's range.

Routing tables are used to determine a path between these nodes. The intermediate nodes act as routers. Every time the topology changes, the routing tables need to be updated, resulting in a lot of network traffic.

To reduce this traffic, often distance vector routing algorithms are used. In these protocols, partial routing tables are maintained, and these only hold information relating to the next router and the distance of the path to each node, instead of the complete path. However, complete routing path information might be useful for some applications, and the use of partial routing tables generally does not provide such information.

The invention provides methods and apparatus as defined in the independent claims.

According to one aspect of the invention, there is provided a method of transmitting routing information within a network, the method comprising:

in response to a change in preferred route from one node to another node within the network, providing a message comprising a digital word in which at least each node in the mesh network other than the one node and the another node is represented by a single binary bit, where the binary bit associated with each node is set to one value if the node is in the preferred route, and the other value if the node is not in the preferred route.

This method enables a single message to be sent as an update message, which only has a number of bits corresponding to the number of nodes in the network (or indeed two less bits as the source and destination node do not need to be included). The information provided enables the other nodes to update full network routing tables.

In this way, the invention provides a method to maintain and update complete routing tables in an efficient way. In this way, every node has knowledge of the complete path to every other node in the network with a minimum of network traffic.

The change in preferred route can arise as a result of the addition of nodes or a change in network topology so that different nodes neighbor each other.

In one example, the message comprises a digital word in which only the nodes in the network other than the one node and the another node are each represented by a single binary bit. Thus, the message does not need any route information concerning the source or destination nodes, and this keeps the update message length to a minimum. The message itself can provide a preferred route from the one node to the another node.

The message is preferably initially generated by a node which neighbors said another node. This message generation is thus prompted by a detected change in the network, and this change is detected by the nodes which neighbor the region of the network that has changed.

The message is preferably provided by said one node to the nodes which neighbor said one node. In this way, messages are sent only between nodes and their neighbors. The neighboring nodes which neighbor said one node can then process the message, and if a change in preferred route from those neighboring nodes results to the another node, further messages are generated by those neighboring nodes. In this way, messages propagate through the network as needed for all of the network routing tables stored in each node to be suitable updated. However, updated messages can be avoided when it is determined that the changes do not have any further affect.

Each further message can provide a preferred route from the respective neighboring node to the another node. Thus, the preferred routes to the new or changed node are progressively updated.

The invention also provides a node of a communications network, comprising a memory which stores a routing table, wherein the routing table comprises a set of entries, with one entry for each node of the network other than the node itself, wherein each entry comprises a digital word in which at least each node in the mesh network other than the one node and the node to which the entry relates is represented by a single binary bit, where the binary bit associated with each node is set to one value if that node is in the preferred route from the node itself to the node to which the entry relates, and the other value if that node is not in the preferred route.

This routing table provides information about all routes to the other nodes, in a manner which simply enables the path length to be determined. By combining the path length information to each node, the route itself can be derived, but without requiring long data entries which specify each complete path.

Each entry can comprises a digital word in which only the nodes in the network other than the node itself and the node to which the entry relates are each represented by a single binary bit.

A network such as a (partial) mesh network can be formed of a plurality of the nodes.

The invention also provides a node routing table update message comprising a digital word in which at least each node in the network other than the source node from which the message originates and a destination node is represented by a single binary bit, where the binary bit associated with each node is set to one value if the node is in the preferred route, and the other value if the node is not in the preferred route.

An example of the invention will be described in detail with reference to the accompanying drawings, in which.

The invention provides a method of transmitting routing information about a path from one node to another node within a network. An update message is in the form of a digital word in which each node in the network (optionally other than the source and destination node) is represented by a single binary bit, where the binary bit associated with each node is set to one value if the node is in the preferred route, and the other value if the node is not in the preferred route. This message defines the nodes which form part of a path through the network.

A first known routing approach makes use of partial routing tables. Each node in a network is identified by a unique address. Depending on the maximum number of nodes, the address can be encoded with x bits.

Partial routing tables only store the distance to each node (in terms of the number of hops) and the gateway which should be used to reach the node.

Every time a routing table update message is received, the proposed path presented by the update message is compared to the existing one. If the proposed path is shorter, the internal routing tables are updated and neighboring nodes are informed of the shorter path.

A message is created providing identification of the node and the distance to this node. This can be encoded as 2*x bits, since the node identification for $2^x$ nodes requires x bits, and the maximum number of hops is $2^x-1$ (for a linear string of routers), which thus also requires at most x bits.

Figures 1, 2, 3, 4:
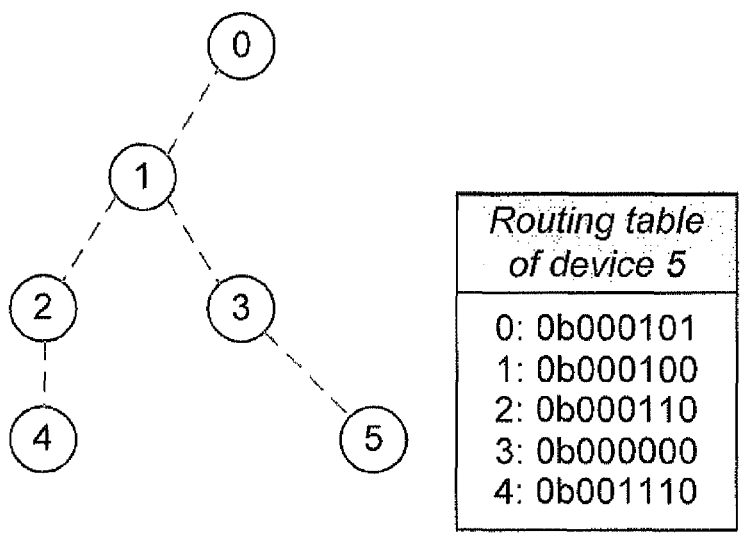
FIG. 1 shows an example of message format for a known mesh network in which partial path information is stored in each node.
FIG. 2 shows an example of message format for a known mesh network in which full path information is stored in each node.
FIG. 3 shows an example of message format for a mesh network in accordance with the invention.
FIG. 4 shows an example of mesh network to explain the operation of the invention.

FIG. 1 shows the information stored in the internal routing table, and this corresponds to the information to be sent in a message providing update information. As shown, there is information giving the distance to the node (as x bits) and the identification of the gateway node (again as x bits). In the internal routing table, this information is stored for each node. Each message is essentially one row of the table in respect of the node which has been affected by the network update.

The device list messages are initiated whenever a new device is discovered in range or when a message is received proposing a shorter path than currently known.

When a device discovers a new device in range it sends out messages to all its other neighbours informing them of the optimized route. The new device can be a device already known but which had a hop count greater than zero, or else it can be a device that was not known and thus not part of the internal table yet. On receipt of such messages, a device compares the proposed hop count with its own hop count. If the proposed one is shorter, it updates its internal entry and informs all other neighbours about the optimized route. If the new hop count is of equal length, the message is ignored. If the proposed path is longer, a message is sent back with the shorter path.

A second known routing approach makes use of complete routing tables. These tables provide knowledge of the complete path to each node in the network. Whenever a path to a node is changed, the neighbors are informed. If the path is shorter or received from the next hop the internal routing tables are updated and the neighboring nodes are informed of the shorter or altered path.

A message is created providing the complete path to the neighboring nodes. Suppose device A has a route to device C via device B. The hop count is 1. Every message device A wants to send to device C will be sent to device B because that is its next hop to C. If for some reason the topology changes to A-B-D-C, device B will inform device A about the new route (B-D-C) to C with hop count 2. Although the hop count is greater than its internal one (=1), it must accept this message and update its internal hop count to 2 because it is received from B (which is the next hop).

FIG. 2 shows the information stored in the internal routing table for each destination node. Again, the update messages to be sent are based on one row of the routing table. As shown, there is information giving identification of each node along the chain of hops between the source node and the destination node. Each hop requires an identification of x bits.

The maximum message size for storing the complete path is equal to the maximum length of the path times the width of the address field, or $(2^x-2)*x$.

In this case, $2^x$ is the maximum number of nodes (since they are uniquely identifiable with x bits, and the −2 is because the node itself and the destination are not part of the path.

Suppose device A receives a message from device B (where device B is a neighbour to device A) about device C. If the proposed route is shorter from device B to C than for the route device A had stored, then device A will update its route and set device B as its next hop for device C (so that it uses the new shorter route via device B). It will propagate this further to all neighbours except the next hop (i.e. there is no need to propagate the message back to device B).

The invention is based on an approach which enables the complete path to be derived, but without transmitting the complete path information as part of the update message.

Instead, the complete path can be reconstructed given the participating nodes in the path. These participating nodes can be encoded as a bitmap of $2^x-2$ bits wide where each bit represents a node in the network. If a node is part of the path, the corresponding bit is set to 1.

FIG. 3 shows the required message to identify the set of nodes forming the path, and which can form the basis of the transmitted message. As in the example above, the internal routing table essentially comprises a table of values with each row of the table corresponding to the message format.

The number of bits is $(2^x-2)$, again because $2^x$ is the maximum number of nodes but reduced by 2 because the source node and the destination node are not part of the path information that needs to be sent.

The optimality principle dictates that if a router J is on the optimal path from router I to router K, then the optimal path from I to J also follows the same route or a similar route of the same length. As a result, the complete routing path can be reconstructed by taking the distances to each intermediate hop into account.

The distance to a node (in terms of the number of hops) is equal to the number of bits set to 1 in the bitmap message of FIG. 3.

An example will now be presented, in which a maximum of 8 devices form a part of the network. The address width is thus 3 bits.

A network of 6 devices is shown in FIG. 4, numbered as devices 0 to 5. The routing table of device 5 is shown.

The routing table gives the route from the node (node 5) to each other node.

A routing word is provided in the routing table for each destination node. The word has as lowest bit the lowest number node, and as highest bit the highest number node. Each word only needs 6 bits. The two MSBs "0b" are a prefix indicating the numbers that follow are in binary format.

Each word omits the bits representing the node itself (i.e. node 5) and the destination node.

For example, the table states that the routing path to device 2 is 0b000110. These bits represent devices 0 (LSb), 1, 3, 4, 6 and 7 (MSb). Device 2 (destination) and 5 (the node itself) are skipped in this bitmap.

Two bits are set to 1, corresponding to nodes 1 and 3, which means that device 2 is 2 hops away. Bit 2 is set which means device 1 is part of the path and bit 3 set indicates that device 3 is also part of the path.

Referring to the entries of device 1 and 3, it can immediately be seen that that device 1 is 1 hop away and device 3 is 0 hops away. Combining all this gives the complete path: 5 to 3 to 1 to 2.

The messages generated in response to a change in topology will now be explained. The messages essentially comprises proposed routing paths from the node sending the message to the node for which the topology has changed. The node to which the message is sent then can choose to update its routing tables if the proposal provides an improvement (and it then needs to propagate the information to its neighbors), or it can ignore the message if no improvement is obtained.

Figure 5:
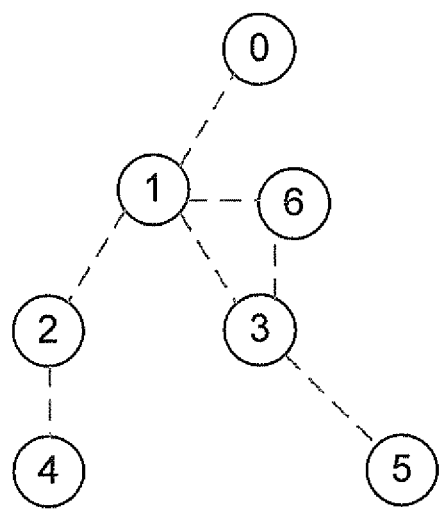
FIG. 5 shows a first example of network change, to explain the operation of the invention.

If the network topology as shown in FIG. 4 is the steady state, it will be assumed the topology changes as shown in FIG. 5, wherein a new device 6 comes in range of devices 1 and 3.

Device 1 and device 3 discover device 6 simultaneously. Both devices mark device 6 as a neighbour device (i.e. hop count=0). Device 1 sends a message to its neighbours 0, 2, 3 which identifies the address of device 6 and the proposed path (in this case the proposed path=0b000000). Thus, the message sent identifies the destination node, and the device sending the message is the source node, for the path being identified.

Device 3 sends a message to its neighbours 1 and 5 (proposed path=0b000000). Note that device 1 and 3 inform each other. This because they don't know if the other device has also discovered device 6, i.e. they don't know that device 6 is in range of device 1 and device 3.

Device 0 receives this message from device 1, sees that it is a new device and updates its internal table. It does not have other neighbours so no messages are being transmitted by device 0.

Device 2 receives the message from device 1, updates it table and propagates the message (proposed path=0b000010 to its other neighbors which is only device 4.

Device 4 acts in the same way as device 0 upon receipt of this message, since it has no further neighbors to send the message to.

Device 1 receives the message from device 3. The proposed hop count is 1 because device 3 is proposing itself as intermediate hop because it does not know that device 1 is also in range of device 6. The proposed hop count provided by device 3 is greater than the internal one for device 1 (0 because it's a neighbor). It ignores this message and does not send a message back because it knows this message will be ignored by device 3 given the proposed hop count of 1.

The same applies for device 3 receiving a message from device 1.

This demonstrates how the internal tables are updated in response to an added node.

Messages are only generated and sent to the extent required for all network nodes to update their routing tables.

A second example is used to show how the internal tables are updated in response to a change in topology of existing nodes.

Figure 6:
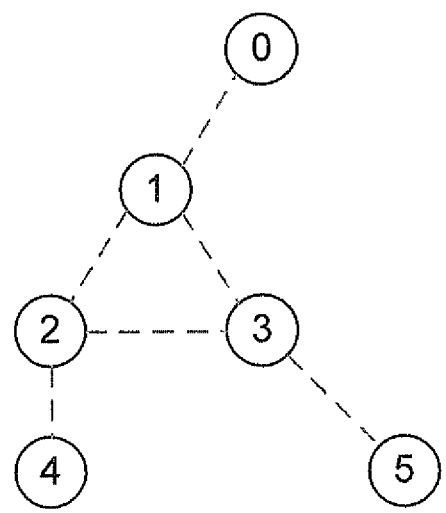
FIG. 6 shows a second example of network change, to explain the operation of the invention.

FIG. 6 shows a change in topology (to that of FIG. 4) in which devices 2 and 3 come in each other's range.

Device 2 discovers a new neighbour (device 3) and informs its other neighbouring devices 1 and 4. The message contains the proposed path 0b000000 to device 3

Device 3 discovers a new neighbour (device 2) and informs its other neighbours 1 and 5. The message contains the proposed path 0b000000 to device 2.

Device 4 receives the message from device 2 and sees that the proposed path from device 2 to device 3 is one hop shorter than its internal route. It updates its internal route. It has no other neighbours so the message is not propagated.

Device 1 receives the message from device 2 but sees that its internal route is one hop shorter (0 hops instead of 1 hop). It does not update its internal table and does not send a message back because (which would suggest a 0 hop route from node 1 to node 2) because it knows this message will be ignored by device 3 given the resulting hop count of 1 from node 1 to node 3.

Device 1 receives the message from device 3 and ignores this one for the same reason.

Device 5 acts in the same way as device 4 upon receipt of the message from device 3.

The device list messages are initiated whenever a new device is discovered in range or when a message is received proposing a shorter path than currently known.

In summary, when a device discovers a new device in range (this can be a device already known but hop count greater than 0 or a device that was not known and thus not part of the internal table yet) it sends out messages to all its other neighbours informing them of the optimized route from the node itself to the new device in range. On receipt of such messages, a device compares the proposed hop count with its own hop count. If the proposed one is shorter, it updates its internal entry and informs all other neighbours about the optimized route. If it's of equal length, the message is ignored. If the proposed path is longer, a message is sent back with the shorter path.

Figure 7:
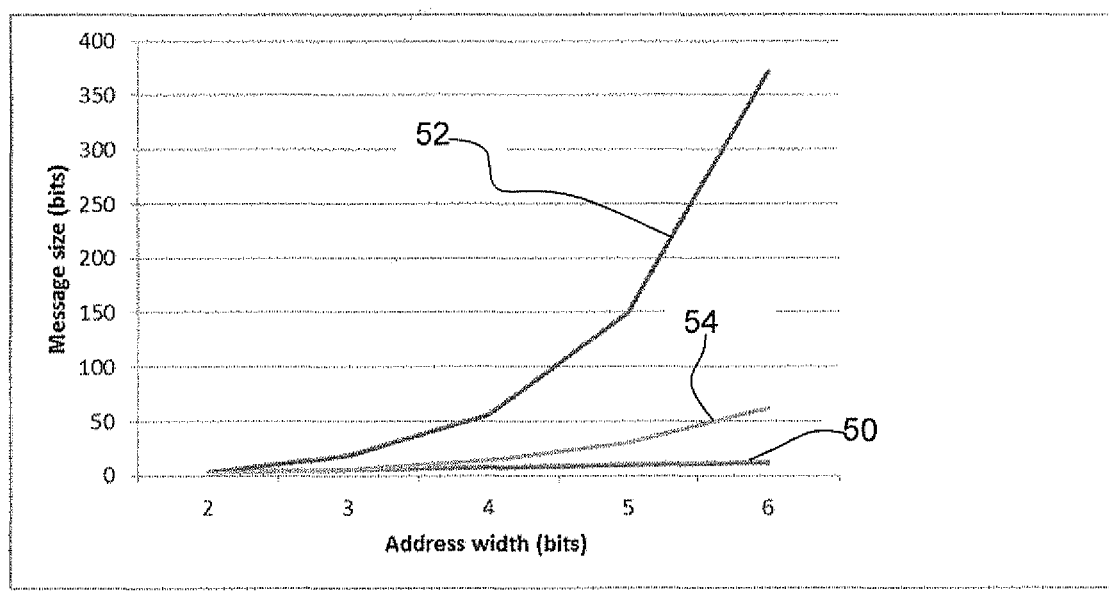
FIG. 7 shows how the message size compares with known message formats for different network sizes.

FIG. 7 shows how the message size increases with the address width in bits. Thus, the x-axis plots the value x. The message size 2x for distance vectors is shown as plot 50, and the message size $x(2^x-2)$ for complete path information is shown as plot 52. The invention is shown as plot 54, which has a message size $(2^x-2)$.

This invention can be used for all types of network topologies. The invention is of particular interest for partial mesh networks.

Various modifications will be apparent to those skilled in the art.

The invention claimed is:

1. A method of transmitting routing information within a network, the method comprising:
   in response to a change in preferred route from one node to another node within the network, providing a message comprising a digital word in which at least each node in the mesh network other than the one node and the another node is represented by a single binary bit, where the single binary bit associated with each node is set to one value if the node is in the preferred route, and the other value if the node is not in the preferred route;
   wherein the preferred route is the route with the lowest hop count, the lowest hop count determined by the number of bits in the digital word set to the value indicating that a node is in the preferred route; and
   wherein the method further comprises receiving a first message from a node which neighbors said one node informing said one node of a shorter route if the route provided by said one node is longer than the preferred route in a routing table of the node which neighbors said one node.

2. The method as claimed in claim 1, wherein the message comprises a digital word in which only the nodes in the network other than the one node and the another node are each represented by said single binary bit.

3. The method as claimed in claim 1, wherein the message provides the preferred route from the one node to the another node.

4. The method as claimed in claim 1, wherein the message is initially generated by a node which neighbors said another node.

5. The method as claimed in claim 1, wherein the message is provided by said one node to only the nodes which neighbor said one node.

6. The method as claimed in claim 4, wherein the neighboring nodes which neighbor said one node process the message, and if the change in the preferred route from those neighboring nodes results to the another node, further messages are generated by those neighboring nodes.

7. The method as claimed in claim 6, wherein each further message provides a preferred route from the respective neighboring node to the another node.

8. A first node of a communications network, comprising a memory which stores a routing table, wherein the routing table comprises a set of entries, with one entry for each node of the network other than the first node itself, wherein each entry comprises a digital word in which at least each node in the mesh network other than the first node and the node to which the entry relates is represented by a single binary bit, where the single binary bit associated with each node is set to one value if that node is in the preferred route from the first node itself to the node to which the entry relates, and the other value if that node is not in the preferred route;
   wherein the preferred route is the route with the lowest hop count, the lowest hop count determined by the number of bits in the digital word set to the value indicating that a node is in the preferred route;
   wherein the entries are configured such that routes related to entries in the routing table are comparable to a route provided by a first message received from a second node which neighbors the first node informing the first node of a shorter route if the route provided by the first node is longer than the preferred route in a routing table of the second node which neighbors the first node.

9. The node as claimed in claim 8, wherein each entry comprises the digital word in which only the nodes in the network other than the node itself and the node to which the entry relates are each represented by said single binary bit.

10. The network comprising a plurality of nodes as claimed in claim 9.

11. The network as claimed in claim 10 comprising a partial mesh network.

12. A node routing table update message comprising a digital word in which at least each node in the network other than the source node from which the message originates and a destination node is represented by a single binary bit, where the single binary bit associated with each node is set to one value if the node is in the preferred route, and the other value if the node is not in the preferred route;
   wherein the preferred route is the route with the lowest hop count, the lowest hop count determined by the number of bits in the digital word set to the value indicating that a node is in the preferred route; and
   wherein the message is configured such that routes related to entries in the routing table are comparable to a route provided by a first message received from a second node which neighbors the source node informing the source node of a shorter route if the route provided by the source node is longer than the preferred route in a routing table of the second node which neighbors the source node.

13. The message as claimed in claim 12, wherein the digital word comprises a digital word in which only the nodes in the mesh network other than the source node and the destination node are each represented by said single binary bit.

* * * * *